US011022706B2

(12) United States Patent
Bogumil et al.

(10) Patent No.: US 11,022,706 B2
(45) Date of Patent: Jun. 1, 2021

(54) RADIOGRAPHIC DETECTOR

(71) Applicant: CARESTREAM HEALTH, INC., Rochester, NY (US)

(72) Inventors: Todd D. Bogumil, Rochester, NY (US); Steven R. Lippold, Bergen, NY (US)

(73) Assignee: Carestream Health, Inc., Rochester, NY (US)

( * ) Notice: Subject to any disclaimer, the term of this patent is extended or adjusted under 35 U.S.C. 154(b) by 85 days.

(21) Appl. No.: 16/476,566

(22) PCT Filed: Feb. 13, 2018

(86) PCT No.: PCT/US2018/017927
§ 371 (c)(1),
(2) Date: Jul. 9, 2019

(87) PCT Pub. No.: WO2018/152081
PCT Pub. Date: Aug. 23, 2018

(65) Prior Publication Data
US 2019/0353810 A1    Nov. 21, 2019

Related U.S. Application Data

(60) Provisional application No. 62/458,625, filed on Feb. 14, 2017.

(51) Int. Cl.
*G01T 7/00* (2006.01)
*G01T 1/20* (2006.01)
(52) U.S. Cl.
CPC ............. *G01T 7/00* (2013.01); *G01T 1/2018* (2013.01)

(58) Field of Classification Search
CPC ................................ G01T 7/00; G01T 1/2018
See application file for complete search history.

(56) References Cited

U.S. PATENT DOCUMENTS

| 4,532,263 | A | * | 7/1985 | Krutchen ............ B29C 44/3461 264/53 |
| 5,843,131 | A | | 12/1998 | McDonough |
| 7,317,190 | B2 | | 1/2008 | Ertel et al. |
| 7,488,946 | B2 | | 2/2009 | Hennessy et al. |
| 7,495,227 | B2 | | 2/2009 | Hennessy et al. |
| 7,566,877 | B2 | | 7/2009 | Bhatt |

(Continued)

FOREIGN PATENT DOCUMENTS

| EP | 0 546 211 B2 | 9/1998 | |
| FR | 3000344 A1 * | 6/2014 | ........... A61B 6/4283 |

(Continued)

OTHER PUBLICATIONS

International Search Report dated May 9, 2018 for International Application No. PCT/US2018/017927, 2 pages.

*Primary Examiner* — David P Porta
*Assistant Examiner* — Shun Lee

(57) ABSTRACT

A digital radiographic detector includes a planar multi-layered core with a two-dimensional array of photo-sensitive cells. A five-sided, integrally formed, rigid enclosure having one open side is configured to receive the multi-layered core through the open side. The planar multi-layered core comprises a foam layer having a recessed pocket on one major side thereof shaped in the form of a metal ground plane positioned in the recessed pocket.

20 Claims, 11 Drawing Sheets

(56) References Cited

U.S. PATENT DOCUMENTS

| | | |
|---|---|---|
| 7,663,114 B2 | 2/2010 | Aoyagi |
| 7,742,274 B2 | 6/2010 | Utschig |
| 7,755,053 B2 | 7/2010 | Chiyoma |
| 7,800,065 B2 | 9/2010 | Konkle et al. |
| 8,035,084 B2 | 10/2011 | Sumi |
| 8,269,182 B2 | 9/2012 | Konkle et al. |
| 8,324,584 B2 | 12/2012 | Sumi |
| 8,642,967 B2 | 2/2014 | Iwakiri et al. |
| 8,680,475 B2 | 3/2014 | Konkle |
| 9,322,934 B2 | 4/2016 | Ogura et al. |
| 2011/0024633 A1* | 2/2011 | Aoyagi .................. G03B 42/04 250/361 R |
| 2011/0133096 A1* | 6/2011 | Konkle .................... G01T 1/244 250/370.09 |
| 2013/0099130 A1* | 4/2013 | Nakahashi ............... A61B 6/00 250/394 |
| 2013/0168564 A1 | 7/2013 | Konkle et al. |
| 2013/0264461 A1 | 10/2013 | Okada et al. |
| 2014/0027636 A1 | 1/2014 | Watano |
| 2015/0309194 A1 | 10/2015 | Sumi et al. |
| 2015/0320373 A1* | 11/2015 | Rieuvernet .......... A61B 6/4405 378/189 |
| 2017/0258422 A1* | 9/2017 | Kim ..................... A61B 6/4452 |

FOREIGN PATENT DOCUMENTS

| | | |
|---|---|---|
| JP | 5381327 B2 | 1/2014 |
| WO | 2013/155372 | 10/2013 |
| WO | 2015/111983 | 7/2015 |
| WO | 2016/028003 | 2/2016 |

\* cited by examiner

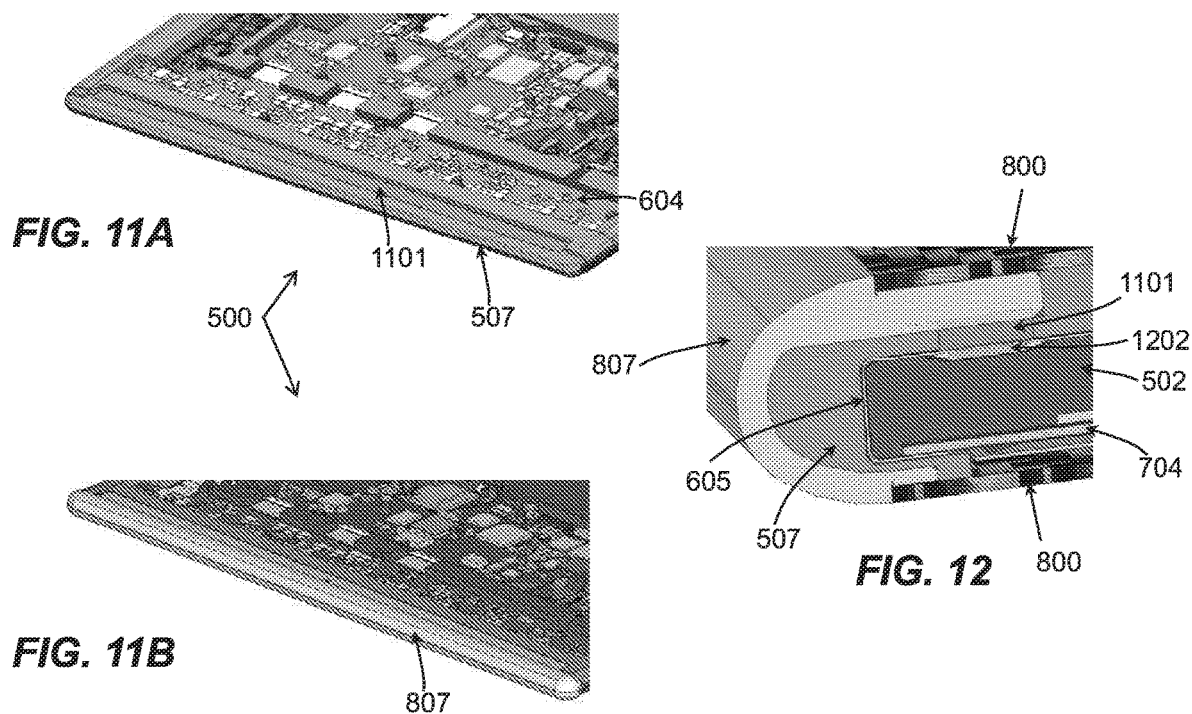

RADIOGRAPHIC DETECTOR

CROSS REFERENCE TO RELATED APPLICATIONS

This application claims the benefit of and is a U.S. National Phase filing of PCT Application PCT/US2018/017927 filed Feb. 13, 2018 entitled "RADIOGRAPHIC DETECTOR", in the name of Todd D. Bogumil et al., which claims benefit of U.S. Patent Application Ser. No. 62/458,625, filed Feb. 14, 2017, in the name of Steven R. Lippold et al., and entitled RADIOGRAPHIC DETECTOR.

BACKGROUND OF THE INVENTION

The subject matter disclosed herein relates to digital radiographic (DR) detectors.

Portable digital radiographic detectors have been widely deployed to improve diagnostic radiographic imaging productivity, image quality and ease of use. In particular, mobile or bedside radiographic imaging is conducted in locations such as intensive care units so that the patient does not need to be transported from their critical care environment. This type of imaging procedure is best served by a portable detector that is light weight and durable to improve ease of use and reliability.

Current digital radiographic detectors typically include an amorphous silicon TFT/photo diode image sensor array that is fabricated on glass using semiconductor processes that are similar to those used for flat panel displays. A scintillator is combined with the image sensor array along with required electronics for signal readout and processing onto an internal core plate which is contained within a durable housing to create the portable DR detector.

FIG. 1 is a perspective view of a digital radiographic (DR) imaging system 10 that may include a generally curved or planar DR detector 40 (shown in a planar embodiment and without a housing for clarity of description), an x-ray source 14 configured to generate radiographic energy (x-ray radiation), and a digital monitor, or electronic display, 26 configured to display images captured by the DR detector 40, according to one embodiment. The DR detector 40 may include a two dimensional array 12 of detector cells 22 (photosensors), arranged in electronically addressable rows and columns. The DR detector 40 may be positioned to receive x-rays 16 passing through a subject 20 during a radiographic energy exposure, or radiographic energy pulse, emitted by the x-ray source 14. As shown in FIG. 1, the radiographic imaging system 10 may use an x-ray source 14 that emits collimated x-rays 16, e.g. an x-ray beam, selectively aimed at and passing through a preselected region 18 of the subject 20. The x-ray beam 16 may be attenuated by varying degrees along its plurality of rays according to the internal structure of the subject 20, which attenuated rays are detected by the array 12 of photosensitive detector cells 22. The curved or planar DR detector 40 is positioned, as much as possible, in a perpendicular relation to a substantially central ray 17 of the plurality of rays 16 emitted by the x-ray source 14. In a curved array embodiment, the source 14 may be centrally positioned such that a larger percentage, or all, of the photosensitive detector cells are positioned perpendicular to incoming x-rays from the centrally positioned source 14. The array 12 of individual photosensitive cells (pixels) 22 may be electronically addressed (scanned) by their position according to column and row. As used herein, the terms "column" and "row" refer to the vertical and horizontal arrangement of the photo sensor cells 22 and, for clarity of description, it will be assumed that the rows extend horizontally and the columns extend vertically. However, the orientation of the columns and rows is arbitrary and does not limit the scope of any embodiments disclosed herein. Furthermore, the term "subject" may be illustrated as a human patient in the description of FIG. 1, however, a subject of a DR imaging system, as the term is used herein, may be a human, an animal, an inanimate object, or a portion thereof.

In one exemplary embodiment, the rows of photosensitive cells 22 may be scanned one or more at a time by electronic scanning circuit 28 so that the exposure data from the array 12 may be transmitted to electronic read-out circuit 30. Each photosensitive cell 22 may independently store a charge proportional to an intensity, or energy level, of the attenuated radiographic radiation, or x-rays, received and absorbed in the cell. Thus, each photosensitive cell, when read-out, provides information defining a pixel of a radiographic image 24, e.g. a brightness level or an amount of energy absorbed by the pixel, that may be digitally decoded by image processing electronics 34 and transmitted to be displayed by the digital monitor 26 for viewing by a user. An electronic bias circuit 32 is electrically connected to the two-dimensional detector array 12 to provide a bias voltage to each of the photosensitive cells 22.

Each of the bias circuit 32, the scanning circuit 28, and the read-out circuit 30, may communicate with an acquisition control and image processing unit 34 over a connected cable 33 (wired), or the DR detector 40 and the acquisition control and image processing unit 34 may be equipped with a wireless transmitter and receiver to transmit radiographic image data wirelessly 35 to the acquisition control and image processing unit 34. The acquisition control and image processing unit 34 may include a processor and electronic memory (not shown) to control operations of the DR detector 40 as described herein, including control of circuits 28, 30, and 32, for example, by use of programmed instructions, and to store and process image data. The acquisition control and image processing unit 34 may also be used to control activation of the x-ray source 14 during a radiographic exposure, controlling an x-ray tube electric current magnitude, and thus the fluence of x-rays in x-ray beam 16, and/or the x-ray tube voltage, and thus the energy level of the x-rays in x-ray beam 16. A portion or all of the acquisition control and image processing unit 34 functions may reside in the detector 40 in an on-board processing system 36 which may include a processor and electronic memory to control operations of the DR detector 40 as described herein, including control of circuits 28, 30, and 32, by use of programmed instructions, and to store and process image data similar to the functions of standalone acquisition control and image processing system 34. The image processing system may perform image acquisition and image disposition functions as described herein. The image processing system 36 may control image transmission and image processing and image correction on board the detector 40 based on instructions or other commands transmitted from the acquisition control and image processing unit 34, and transmit corrected digital image data therefrom. Alternatively, acquisition control and image processing unit 34 may receive raw image data from the detector 40 and process the image data and store it, or it may store raw unprocessed image data in local memory, or in remotely accessible memory.

With regard to a direct detection embodiment of DR detector 40, the photosensitive cells 22 may each include a sensing element sensitive to x-rays, i.e. it absorbs x-rays and generates an amount of charge carriers in proportion to a magnitude of the absorbed x-ray energy. A switching element may be configured to be selectively activated to read out the charge level of a corresponding x-ray sensing element. With regard to an indirect detection embodiment of DR detector 40, photosensitive cells 22 may each include a sensing element sensitive to light rays in the visible spectrum, i.e. it absorbs light rays and generates an amount of charge carriers in proportion to a magnitude of the absorbed light energy, and a switching element that is selectively activated to read the charge level of the corresponding sensing element. A scintillator, or wavelength converter, may be disposed over the light sensitive sensing elements to convert incident x-ray radiographic energy to visible light energy. Thus, in the embodiments disclosed herein, it should be noted that the DR detector 40 (or DR detector 300 in FIG. 3 or DR detector 400 in FIG. 4) may include an indirect or direct type of DR detector.

Examples of sensing elements used in sensing array 12 include various types of photoelectric conversion devices (e.g., photosensors) such as photodiodes (P-N or PIN diodes), photo-capacitors (MIS), photo-transistors or photoconductors. Examples of switching elements used for signal read-out include a-Si TFTs, oxide TFTs, MOS transistors, bipolar transistors and other p-n junction components.

FIG. 2 is a schematic diagram 240 of a portion of a two-dimensional array 12 for a DR detector 40. The array of photosensor cells 212, whose operation may be consistent with the photosensor array 12 described above, may include a number of hydrogenated amorphous silicon (a-Si:H) n-i-p photodiodes 270 and thin film transistors (TFTs) 271 formed as field effect transistors (FETs) each having gate (G), source (S), and drain (D) terminals. In embodiments of DR detector 40 disclosed herein, such as a multilayer DR detector (400 of FIG. 4), the two-dimensional array of photosensor cells 12 may be formed in a device layer that abuts adjacent layers of the DR detector structure, which adjacent layers may include a rigid glass layer or a flexible polyimide layer or a layer including carbon fiber without any adjacent rigid layers. A plurality of gate driver circuits 228 may be electrically connected to a plurality of gate lines 283 which control a voltage applied to the gates of TFTs 271, a plurality of readout circuits 230 may be electrically connected to data lines 284, and a plurality of bias lines 285 may be electrically connected to a bias line bus or a variable bias reference voltage line 232 which controls a voltage applied to the photodiodes 270. Charge amplifiers 286 may be electrically connected to the data lines 284 to receive signals therefrom. Outputs from the charge amplifiers 286 may be electrically connected to a multiplexer 287, such as an analog multiplexer, then to an analog-to-digital converter (ADC) 288, or they may be directly connected to the ADC, to stream out the digital radiographic image data at desired rates. In one embodiment, the schematic diagram of FIG. 2 may represent a portion of a DR detector 40 such as an a-Si:H based indirect flat panel, curved panel, or flexible panel imager.

Incident x-rays, or x-ray photons, 16 are converted to optical photons, or light rays, by a scintillator, which light rays are subsequently converted to electron-hole pairs, or charges, upon impacting the a-Si:H n-i-p photodiodes 270. In one embodiment, an exemplary detector cell 222, which may be equivalently referred to herein as a pixel, may include a photodiode 270 having its anode electrically connected to a bias line 285 and its cathode electrically connected to the drain (D) of TFT 271. The bias reference voltage line 232 can control a bias voltage of the photodiodes 270 at each of the detector cells 222. The charge capacity of each of the photodiodes 270 is a function of its bias voltage and its capacitance. In general, a reverse bias voltage, e.g. a negative voltage, may be applied to the bias lines 285 to create an electric field (and hence a depletion region) across the pn junction of each of the photodiodes 270 to enhance its collection efficiency for the charges generated by incident light rays. The image signal represented by the array of photosensor cells 212 may be integrated by the photodiodes while their associated TFTs 271 are held in a non-conducting (off) state, for example, by maintaining the gate lines 283 at a negative voltage via the gate driver circuits 228. The photosensor cell array 212 may be read out by sequentially switching rows of the TFTs 271 to a conducting (on) state by means of the gate driver circuits 228. When a row of the pixels 22 is switched to a conducting state, for example by applying a positive voltage to the corresponding gate line 283, collected charge from the photodiode in those pixels may be transferred along data lines 284 and integrated by the external charge amplifier circuits 286. The row may then be switched back to a non-conducting state, and the process is repeated for each row until the entire array of photosensor cells 212 has been read out. The integrated signal outputs are transferred from the external charge amplifiers 286 to an analog-to-digital converter (ADC) 288 using a parallel-to-serial converter, such as multiplexer 287, which together comprise read-out circuit 230.

This digital image information may be subsequently processed by image processing system 34 to yield a digital image which may then be digitally stored and immediately displayed on monitor 26, or it may be displayed at a later time by accessing the digital electronic memory containing the stored image. The flat panel DR detector 40 having an imaging array as described with reference to FIG. 2 is capable of both single-shot (e.g., static, radiographic) and continuous (e.g., fluoroscopic) image acquisition.

FIG. 3 shows a perspective view of an exemplary prior art generally rectangular, planar, portable wireless DR detector 300 according to an embodiment of DR detector 40 disclosed herein. The DR detector 300 may include a flexible substrate to allow the DR detector to capture radiographic images in a curved orientation. The flexible substrate may be fabricated in a permanent curved orientation, or it may remain flexible throughout its life to provide an adjustable curvature in two or three dimensions, as desired. The DR detector 300 may include a similarly flexible housing portion 314 that surrounds a multilayer structure, or core, comprising a flexible photosensor array portion 22 of the DR detector 300. The housing portion 314 of the DR detector 300 may include a continuous, rigid or flexible, x-ray opaque material or, as used synonymously herein a radio-opaque material, surrounding an interior volume of the DR detector 300. The housing portion 314 may include four flexible edges 318, extending between the top side 321 and the bottom side 322, and arranged substantially orthogonally in relation to the top and bottom sides 321, 322. The bottom side 322 may be continuous with the four edges and disposed opposite the top side 321 of the DR detector 300. The top side 321 comprises a top cover 312 attached to the housing portion 314 which, together with the housing portion 314, substantially encloses the core in the interior volume of the DR detector 300. The top cover 312 may be attached to the housing 314 to form a seal therebetween, and be made of a material that passes x-rays 16 without significant attenuation thereof, i.e., an x-ray transmissive material or, as used synonymously herein, a radiolucent material, such as a carbon fiber, carbon fiber embedded plastic, polymeric, elastomeric and other plastic based material.

With reference to FIG. 4, there is illustrated in schematic form an exemplary cross-section view along section 4-4 of the exemplary embodiment of the DR detector 300 (FIG. 3). For spatial reference purposes, one major surface, or side, of the DR detector 400 may be referred to as the top side 451 and a second major surface, or side, of the DR detector 400 may be referred to as the bottom side 452, as used herein. The core layers, or sheets, may be disposed within the interior volume 450 enclosed by the housing 314 and top cover 312 and may include a flexible curved or planar scintillator layer 404 over a curved or planar the two-dimensional imaging sensor array 12 shown schematically as the device layer 402. The scintillator layer 404 may be directly under (e.g., directly connected to) the substantially planar top cover 312, and the imaging array 402 may be directly under the scintillator 404. Alternatively, a flexible layer 406 may be positioned between the scintillator layer 404 and the top cover 312 as part of the core layered structure to allow adjustable curvature of the core layered structure and/or to provide shock absorption. The flexible layer 406 may be selected to provide an amount of flexible support for both the top cover 312 and the scintillator 404, and may comprise a foam rubber type of material. The layers just described comprising the core layered structure each may generally be formed in a rectangular shape and defined by edges arranged orthogonally and disposed in parallel with an interior side of the edges 318 of the housing 314, as described in reference to FIG. 3.

A substrate layer 420 may be disposed under the imaging array 402, such as a rigid glass layer, in one embodiment, or flexible substrate comprising polyimide or carbon fiber upon which the array of photosensors 402 may be formed to allow adjustable curvature of the array, and may comprise another layer of the core layered structure. Under the substrate layer 420 a radio-opaque shield layer 418, such as lead, may be used as an x-ray blocking layer to help prevent scattering of x-rays passing through the substrate layer 420 as well as to block x-rays reflected from other surfaces in the interior volume 450. Readout electronics, including the scanning circuit 28, the read-out circuit 30, the bias circuit 32, and processing system 36 (all shown in FIG. 1) may be formed adjacent the imaging array 402 or, as shown, may be disposed below frame support member 416 in the form of integrated circuits (ICs) electrically connected to printed circuit boards (PCBs) 424, 425. The imaging array 402 may be electrically connected to the readout electronics 424 (ICs) over a flexible connector 428 which may comprise a plurality of flexible, sealed conductors known as chip-on-film (CoF) connectors.

X-ray flux may pass through the radiolucent top panel cover 312, in the direction represented by an exemplary x-ray beam 16, and impinge upon scintillator 404 where stimulation by the high-energy x-rays 16, or photons, causes the scintillator 404 to emit lower energy photons as visible light rays which are then received in the photosensors of imaging array 402. The frame support member 416 may connect the core layered structure to the housing 314 and may further operate as a shock absorber by disposing elastic pads (not shown) between the frame support beams 422 and the housing 314. Fasteners 410 may be used to attach the top cover 312 to the housing 314 and create a seal therebetween in the region 430 where they come into contact. In one embodiment, an external bumper 412 may be attached along the edges 318 of the DR detector 400 to provide additional shock-absorption.

Recently, processes have been developed that enable fabrication of the image sensor array onto durable thin substrates such as polyimide. This highly durable substrate enables the use of alternative housing components that are lighter in weight since the need for a glass substrate is reduced.

The discussion above is merely provided for general background information and is not intended to be used as an aid in determining the scope of the claimed subject matter.

BRIEF DESCRIPTION OF THE INVENTION

A digital radiographic detector includes a planar multi-layered core with a two-dimensional array of photo-sensitive cells. A five-sided, integrally formed, rigid enclosure having one open side is configured to receive the multi-layered core through the open side. The planar multi-layered core comprises a foam layer having a recessed pocket on one major side thereof shaped in the form of a metal ground plane positioned in the recessed pocket. Advantages that may be realized in the practice of some disclosed embodiments of the DR detector include light weight, and durable DR housing and core plate assembly.

In one embodiment, a digital radiographic detector has a planar multi-layered core including a two-dimensional array of photo-sensitive cells. A five-sided, integrally formed, rigid, carbon fiber based enclosure having only one open side is configured to receive the multi-layered core through the open side. The open side is disposed on an end of the enclosure having the shortest width dimension. The planar multi-layered core comprises a foam layer having a recessed pocket on one major side thereof shaped in the form of a metal ground plane positioned in the recessed pocket.

In one embodiment of the DR detector core, a carbon fiber housing in the form of a four or five sided box is used to create a structurally sound, fluid resistant outer enclosure. Alternative materials for the enclosure may include machined aluminum or magnesium. In another embodiment, the enclosure may be made from a rigid plastic material. Features of the enclosure include an opening to enable insertion of the layered core subassembly that comprises a high density foam plate with integral metal ground plate onto which the sensor panel with attached scintillator, sensor readout electronics, and image data processing circuit boards are mated.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIGS. 11A-11B are perspective views of exemplary thermal dissipation structures within the DR detector assembly; and FIG. 12 is a cross section view of the thermal dissipation structured of FIGS. 11A-11B.

DETAILED DESCRIPTION OF THE INVENTION

Figure 1:
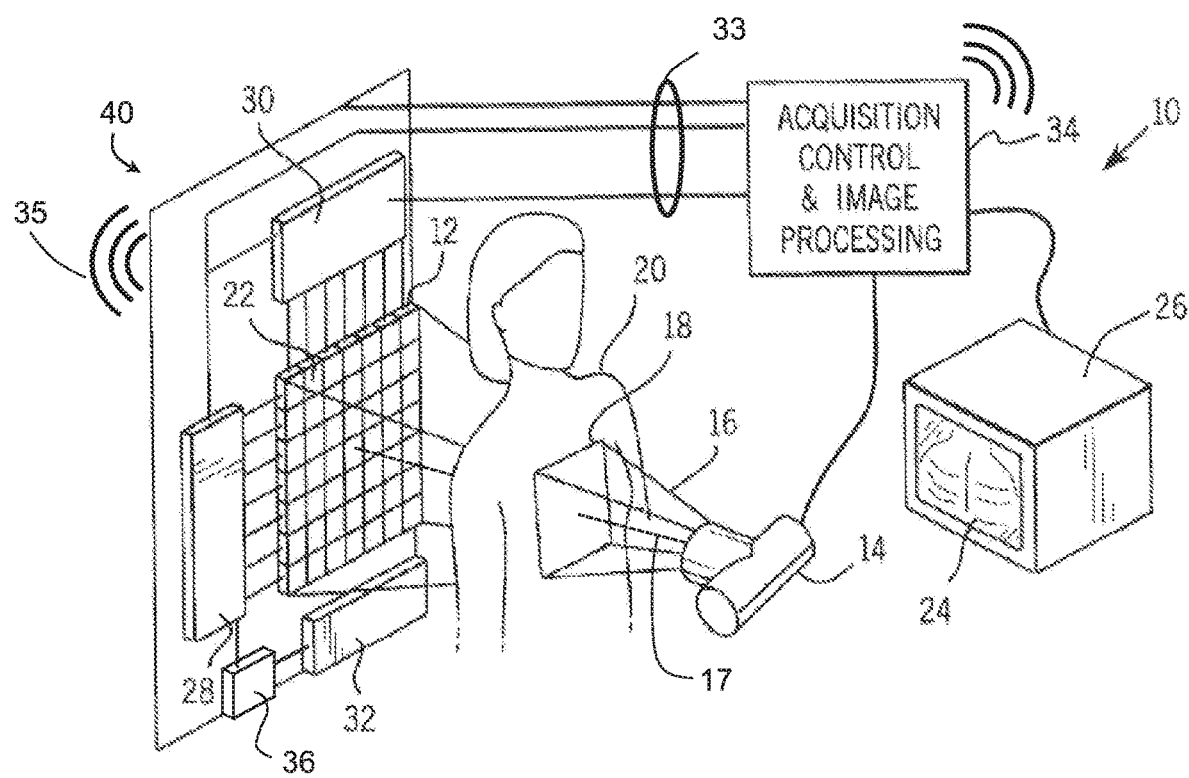
FIG. 1 is a schematic perspective view of an exemplary x-ray system.
Figure 2:
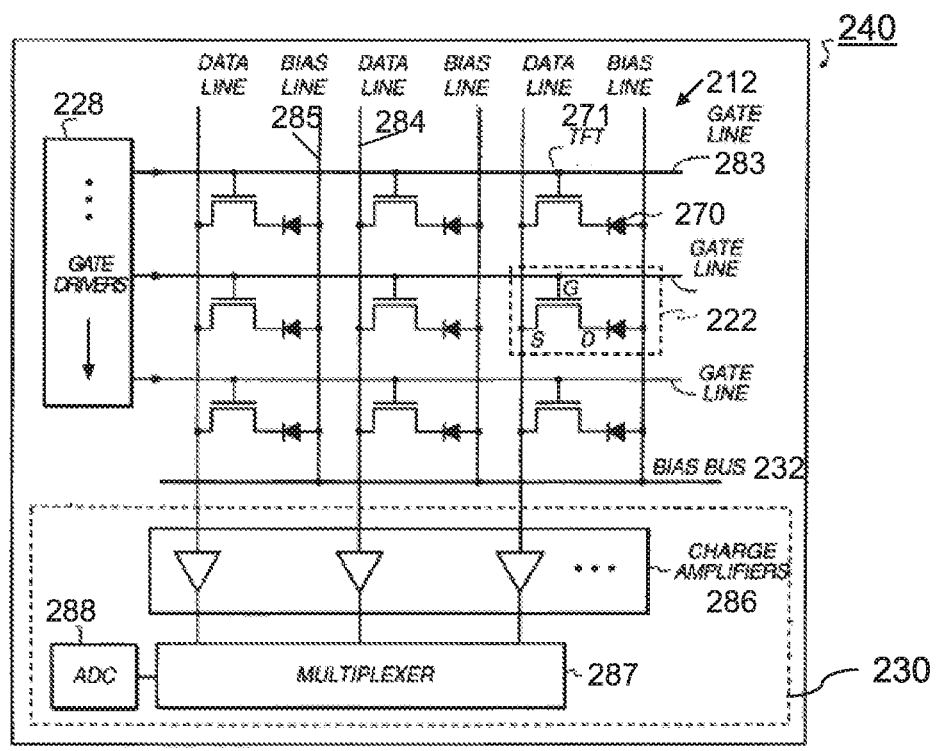
FIG. 2 is a schematic diagram of a photosensor array in a radiographic detector.
Figure 3:
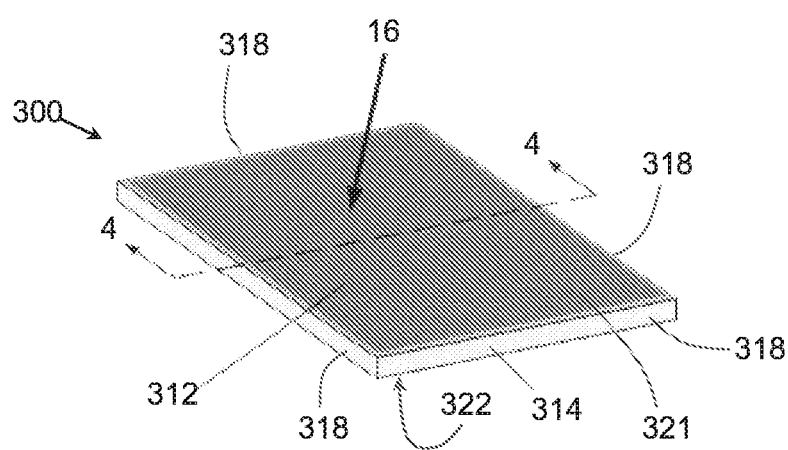
FIG. 3 is a perspective diagram of an exemplary DR detector.
Figure 4:
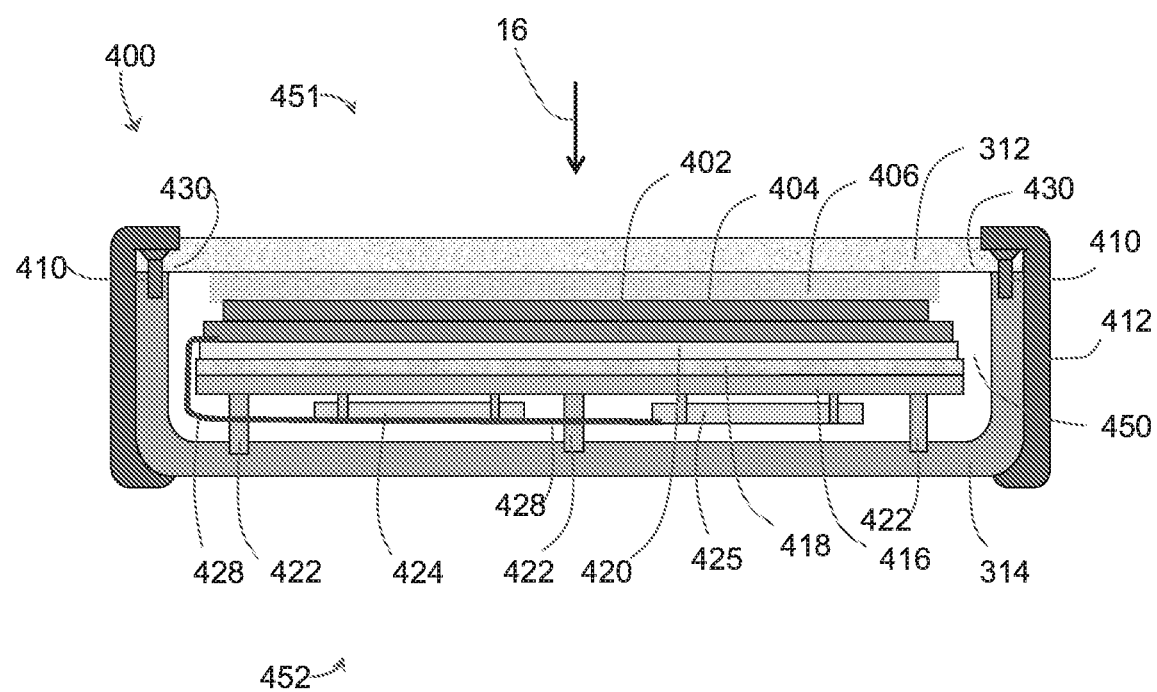
FIG. 4 is a cross section diagram of an exemplary DR detector.
Figure 5A:
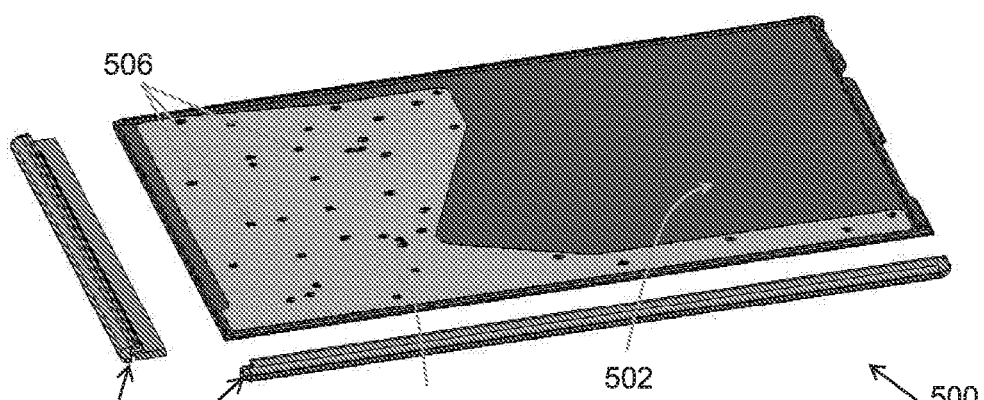
FIGS. 5A-5B are perspective views of exemplary core components of a DR detector.
Figure 5B:
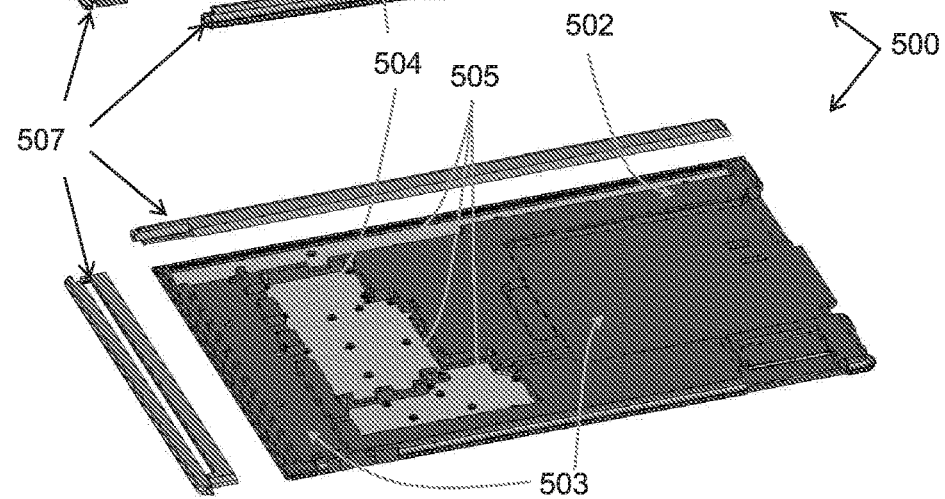

Referring to FIGS. 5A and 5B, there is illustrated a multi layered core 500 having a substantially planar, rectangular high density foam layer 502 machined to form recessed pockets 503 on two major sides thereof. A plate 504 formed from a metal, such as aluminum, is positioned in a recessed pocket on a top side of the foam layer 502 as shown in FIG. 5A. The metal plate, or ground plane, 504 may be glued to the foam layer 502 to secure it in position. Recessed pockets 503 are also machined in a bottom side of the foam layer 502 as shown in FIG. 5B, which bottom side pockets 503 will have electronic components placed therein. The foam layer 502 is also machined to form cutouts 505 therethrough wherein printed circuit boards and other electronics may be placed therein and positioned against the ground plane 504, as described herein. The ground plane 504 functions as an electrical ground for the electronic components to be assembled as described herein. As shown in FIG. 5B, the metal ground plane 504 is visible through the cutouts 505.

The metal ground plane 504 includes a plurality of holes 506, some of which may be threaded, for attaching electrical and mechanical components. Protective end caps 507, also made from the same or similar high density foam as the foam layer 502 are positioned along the edges of the foam layer 502 after electronic components are positioned thereon. As referred to herein, a width dimension of the multi layered core 500 is parallel to the shorter sides thereof as compared to the length dimension which is parallel to the longer sides of the multi layered core 500. The top and bottom sides of the multi layered core 500, as shown in FIGS. 5A and 5B, respectively, together with further detector assembly layers as described herein may be referred to as major surfaces of the multi layered core 500. As shown in FIG. 5A, an area of the top side major surface of the multi layered core 500 made from the foam layer 502 may be about the same or greater than an area made from the metal ground plane 504. According to embodiments of the multi layered core 500 disclosed herein, an area of the metal ground plane 504 may be designed to cover from about 40% of the top side major surface area or up to about 65% of the top side major surface area. The foam used for foam layer 502 and the end caps 507, and other foam components described herein may include high density, thermoplastic, closed cell foams having good heat and flame resistance, heat and electrical insulating properties, a high strength to weight ratio and low moisture absorption. A high density foam such as a polyetherimide based thermoplastic foam or a poly vinylidene fluoride based foam may be used. Alternatively, the foam components may be formed from silicone or rubber.

Figure 6A:
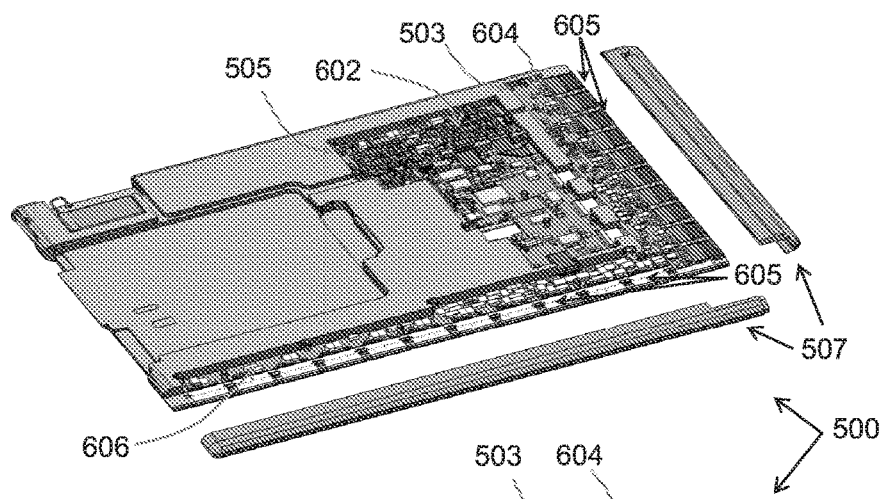
FIGS. 6A-6B are perspective views of additional exemplary board-side core components of a DR detector.
Figure 6B:
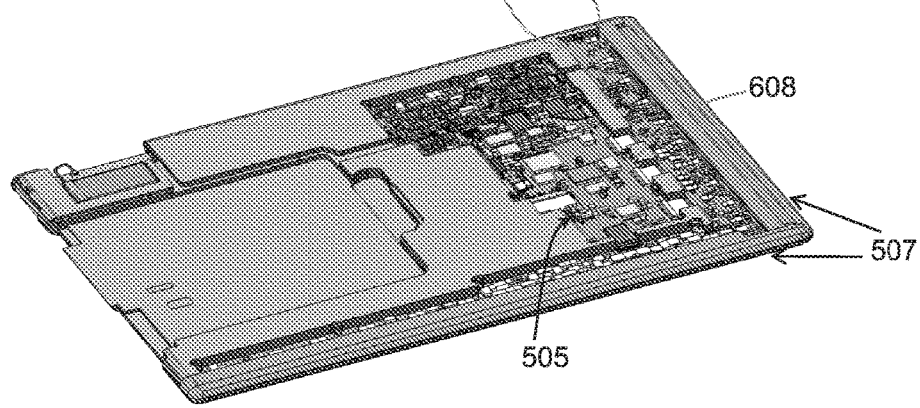

FIGS. 6A and 6B illustrate the bottom side of the multi layered core 500 having PCBs placed in the cutouts 505 and recessed pockets 503. The PCBs 602, 606, 608, placed in the cutouts 505 abut the grounding plane 504 and may be connected thereto using screws through the PCB into the holes 506 of the grounding plane 504. The screws may be used to electrically connect the PCBs to the grounding plane 504 or they may be separately electrically connected together. The PCB 604 is positioned in the recessed pocket 503. The PCBs may include, for example, a power distribution electronics PCB 602, a PCB 604 containing read out integrated circuits (ROICs), a PCB 606 for gate driver circuitry, and a PCB 608 having a main processor section. Some of the PCBs having the gate driver circuitry 606 and/or the ROICs 604 may include conductive communication lines (CoFs) 605 extending from the PCBS 604, 606, around an edge of the foam layer 502 and ground plane 504 assembly to enable digital communication between the PCB electronics and the radiographic sensor array on the top side of the multi layered core 500 which includes the two-dimensional array of photo-sensitive cells, as described herein. As shown in FIG. 6B, the protective foam ends caps 507 may be positioned on the edges of the foam layer 502 and ground plane 504 assembly over the CoFs 605.

Figure 7A:
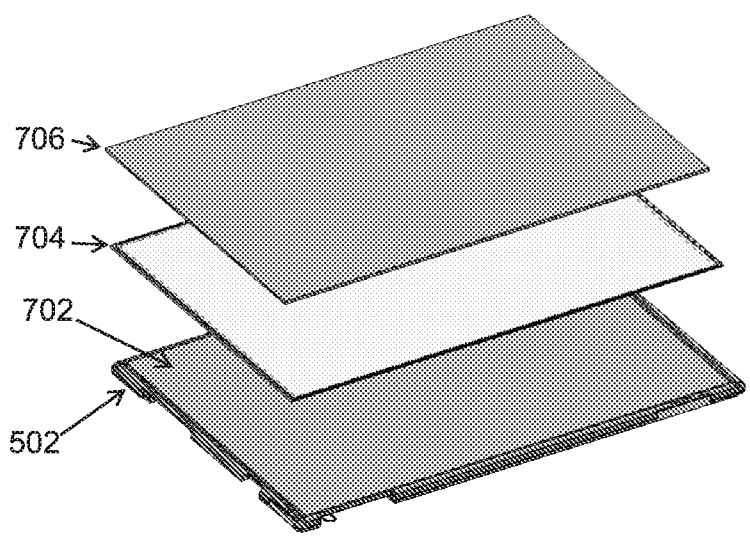
FIGS. 7A-7B are perspective views of exemplary sensor-side core components of a DR detector.
Figure 7B:
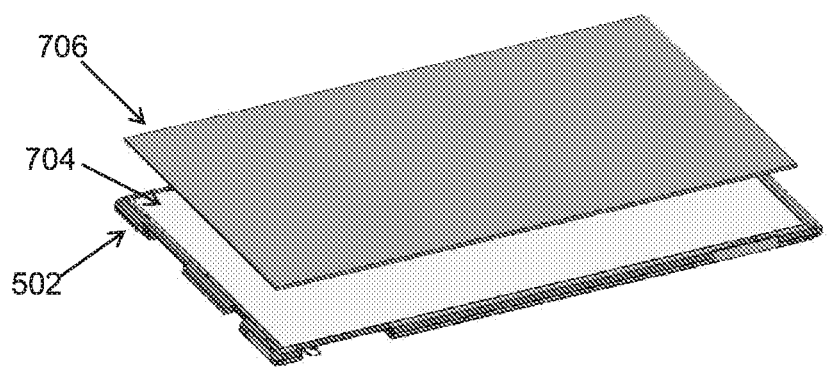

FIGS. 7A-7B illustrate the top side of the multi layered core 500. A lead layer 702 is positioned against the top side of the multi layered core 500 to provide shielding against x-rays that may scatter near the DR detector assembly. The lead layer 702 has an area substantially equivalent to an area of a major surface of the multi layered core 500 and, in the embodiments described herein, is the only metal layer in the multi layered core 500 having as extensive an area as the multi layered core 500 itself. The metal grounding plane 504 may, at most, cover about 65% of the area covered by the lead layer 702, as mentioned herein. A sensor layer 704 which may comprise a scintillator layer laminated onto the two-dimensional array of photosensitive cells, is placed on the lead layer 702 and is seated on the top side of the multi layered core 500 as shown in FIG. 7B. The sensor layer 704 may further include a substrate upon which the two-dimensional array of photosensors is formed. The substrate may include a rigid glass substrate or it may be formed as a flexible substrate such as a polyimide substrate. A shock absorbing foam layer 706 is positioned on top of the sensor layer 704 and typically abuts an inside surface of an enclosure for the multi layered core 500. Altogether, the multi layered core 500 has a thickness of between about one-eighth inch and about one-half inch including the PCB circuitry attached thereto.

Figure 8A:
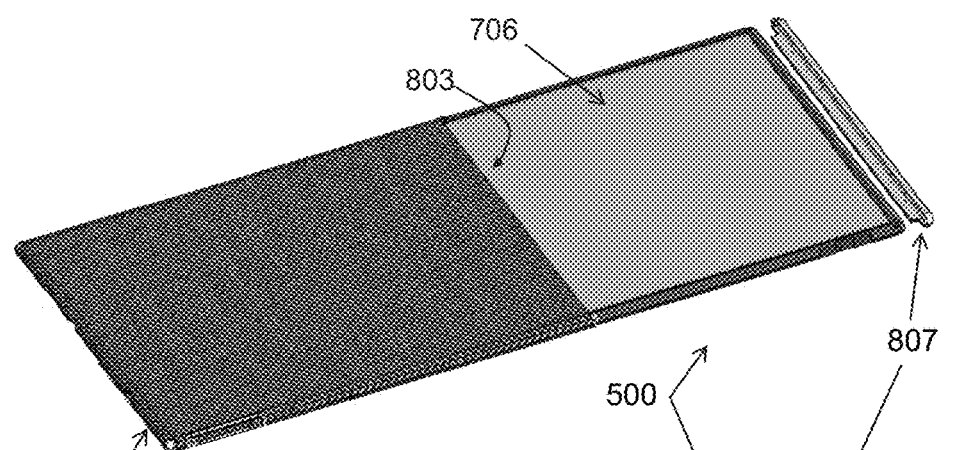
FIGS. 8A-8B are exploded perspective views of final DR detector assembly.
Figure 8B:
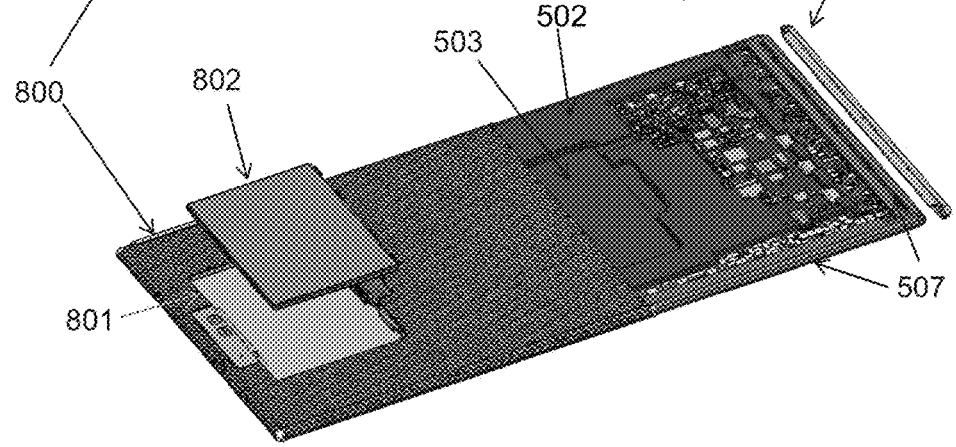
Figure 9A:
FIGS. 9A-9B are perspective views of completed DR detector assembly.
Figure 9B:
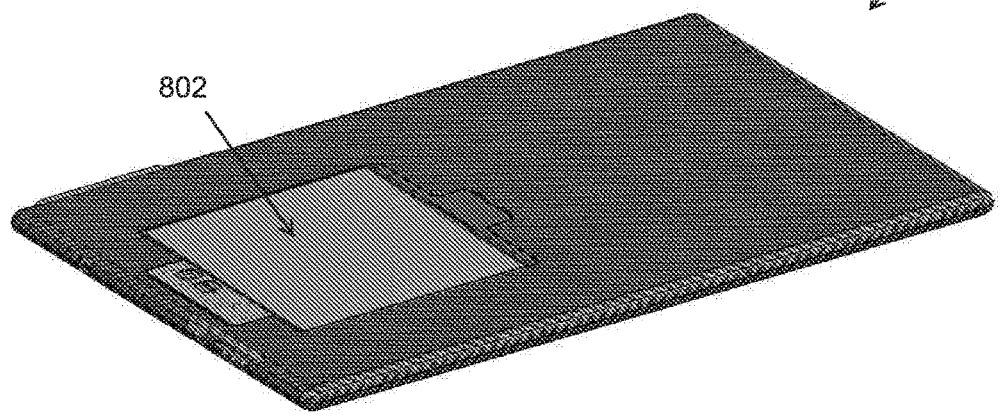

FIGS. 8A-8B illustrate the top and bottom sides, respectively, of the multi layered core 500, as assembled, being inserted into an open end 803 of an enclosure, or housing, 800 which enclosure 800 may also be referred to as having corresponding top and bottom sides. A bottom side of the enclosure 800, as shown in FIG. 8B, includes an opening 801 for a battery 802 to be placed therethrough into a corresponding recessed pocket 503 of the foam layer 502 after the multi layered core 500 is fully inserted into the enclosure 800. Subsequently, an enclosure end cap 807 may be positioned in the open end 803 of the enclosure to seal the open end 803 of the enclosure 800 and complete the assembly of the DR detector 900 (FIGS. 9A-9B). Such an end cap 807 may be formed out of aluminum and positioned in thermal contact with one or more of the PCBs, as described herein. The open end 803 may have a height of between about one-eighth inch and about one-half inch, similar to the thickness of the multi layered core 500 to allow slidable entry of the multi layered core 500 through the open end 803. In one embodiment, the shock absorbing foam layer 706 may be compressed to half its thickness upon the multi-layered core 500 being inserted into the enclosure 800. The enclosure 800, as shown, is a carbon fiber based material such as a twill type of carbon fiber, however, other carbon fiber types of enclosures may be used such as carbon fiber embedded plastics. In addition to carbon fiber, magnesium, aluminum, and plastic enclosures may be used, similar in form as the carbon fiber enclosure 800.

As shown, the enclosure 800 is a five-sided enclosure formed as a unitary integrated whole having only one open end parallel to a width of the multi-layer core 500. In another separate embodiment, the enclosure 800 may be formed as a four-sided enclosure, such as a flat tube having a rectangular cross section with two opposing open ends. In such an embodiment, the multi-layer core 500 could be inserted into either open end of the four-sided enclosure and two enclosure end caps 807 could be used to seal the opposing open ends of such an enclosure. FIGS. 9A-9B illustrate the top and bottom sides, respectively, of a completed assembly of the DR detector 900, wherein the battery 802 may be removed and replaced through a bottom side of the DR detector 900 as described herein.

Figure 10A:
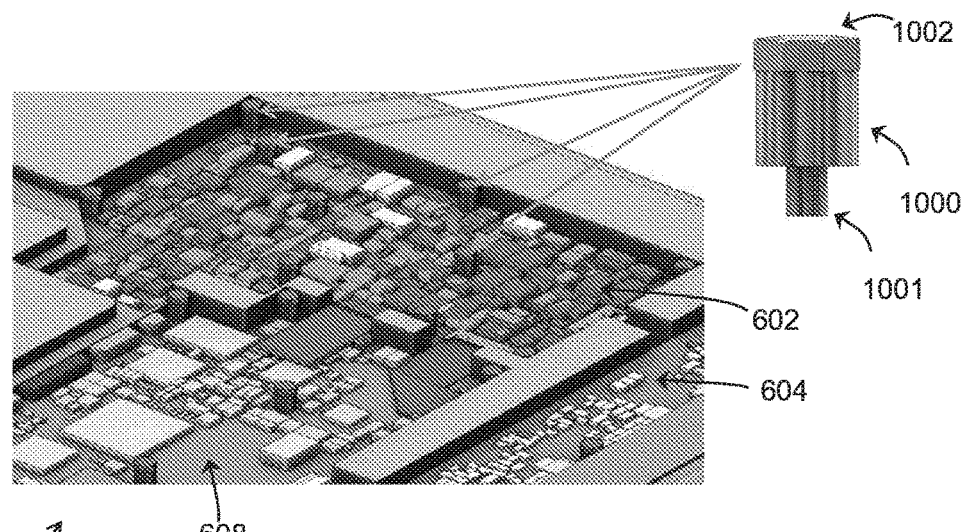
FIGS. 10A-10B are perspective views of exemplary support structures within the DR detector assembly.
Figure 10B:
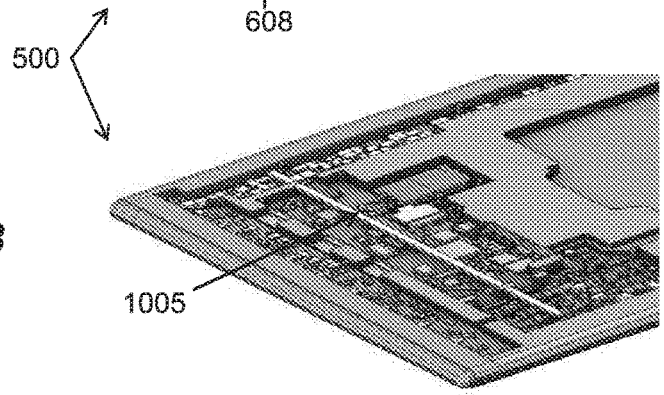

FIGS. 10A-10B illustrate a deflection limiter 1000 used to attach the PCBs 602, 604, 608, to the grounding plane 504 (not shown). The deflection limiter 1000 may include a bottom portion 1001 that may be inserted through a hole in the PCBs 602, 604, 608, into the holes 506 of the grounding plane 504 to secure the PCBs 602, 604, 608, directly to the grounding plane 504. In one embodiment, the bottom portion 1001 of the deflection limiter may be threaded to engage a threaded hole 506 of the grounding plane 504 to screw the PCBs 602, 604, 608, directly to the grounding plane 504. In addition, the deflection limiters 1000 may be disposed in locations selected to prevent excessive deflection of the enclosure 800 by providing a pillar to contact an interior surface of the enclosure 800 when the multi-layer core 500 is inserted therein and so support the enclosure 800 to prevent excessive deflection thereof. An upper surface 1002 of the deflection limiter 1000 may be formed in a convex (domed) shape to prevent edges of the deflection limiter from marring an interior surface of the enclosure 800 coming into contact with the deflection limiter 800. Another feature of the multi layered core 500 used to strengthen rigidity of the DR detector assembly is a carbon fiber stiffening beam 1005 positioned along a width dimension of the multi layered core 500. The carbon fiber stiffening beam 1005 may be attached to the PCBs using brackets or they may be attached to the tops of selectively positioned deflection limiters 1000.

FIGS. 11A-11B illustrate the multi layered core 500 having a thermally conductive pad 1101 formed in the protective foam end cap 507 that is adjacent the PCB 604 containing the ROICs described herein. The thermally conductive pad 1101 may be used to provide thermal dissipation of heat generated by electronics in the multi layered core 500. Preferably, the thermally conductive pad 1101 is used in conjunction with the aluminum enclosure cap 807 placed on the protective foam end cap 507, as shown in FIG. 11B, and in contact with the thermally conductive pad 1101. FIG. 11B shows the aluminum enclosure cap 807 in position on the protective foam end cap 507 without the enclosure 800 for illustration purposes. FIG. 12 is a close-up cross section of an edge of the DR detector assembly, which edge is parallel to the width of the multi-layer core 500. With reference to FIG. 12, the thermally conductive pad 1101 is in physical contact with an IC chip 1202 of the CoF 605. The CoF 605 extends around an edge of the foam layer 502, as described herein, and is electrically connected to the sensor layer 704 at one end, and is electrically connected to the ROICs of PCB 604 at another end (not shown in FIG. 12). The IC chip 1202 of the CoF 605 may be a source of heat generation that, without a thermal exit pathway to an external environment of the DR detector 900, may cause a malfunction of the CoF 605 electronics, for example. Thus, the thermally conductive pad 1101 provides a portion of a thermal exit pathway by physically contacting the IC chip 1202 and absorbing heat therefrom. When the external aluminum enclosure cap 807 is in position to cover the open end of the enclosure 800, as shown, the aluminum enclosure cap 807 physically contacts the thermally conductive pad 1101 to absorb heat therefrom and functions as another portion of a thermally conductive exit pathway to dissipate heat from the thermally conductive pad 1101 to the external environment.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A digital radiographic detector comprising:
   a plurality of electronic circuit boards;
   a planar multi-layered core comprising a two-dimensional array of photo-sensitive cells and a foam layer, the foam layer having a plurality of recessed pockets and cutouts on a first major side thereof, each recessed pocket and cutout having an outline that matches only one of the plurality of electronic circuit boards to allow only the matching one of the plurality of electronic circuit boards to be positioned therein; and
   a five-sided rigid enclosure having only one open side, the rigid enclosure integrally formed and configured to receive the multi-layered assembly through the one open side.

2. The detector of claim 1, wherein the only one open side is disposed on an end of the enclosure having the shortest width.

3. The detector of claim 2, wherein the enclosure comprises a carbon fiber based material.

4. The detector of claim 3, wherein the foam layer includes a recessed pocket on a second major side thereof opposite the first major side, the recessed pocket on the second major side having an outline formed to match an outline of a metal ground plane to receive the metal ground plane therein, and wherein at least two of the electronic circuit boards abut the metal ground plane through a cutout in the foam layer.

5. The detector of claim 4, wherein the foam layer is flame resistant, temperature insulating, and electrically insulating.

6. The detector of claim 4, further comprising a plurality of deflection limiters attached to the printed circuit board and to the ground plane to limit deflection of the two major surfaces of the enclosure toward each other.

7. The detector of claim 3, wherein the electronic circuit boards include electrically conductive lines extending from the electronic circuit boards around an edge of the planar multi-layered core to the two-dimensional array of photo-sensitive cells.

8. The detector of claim 7, further comprising a foam end cap having a thermal channel formed therein that is configured to be thermally coupled to the electrically conductive lines and configured to cover the electrically conductive lines.

9. The detector of claim 8, further comprising an enclosure end cap configured to cover the only one open side and to thermally contact the thermal channel when covering the only one open side.

10. The detector of claim 9, wherein the enclosure end cap comprises aluminum.

11. The detector of claim 3, wherein the planar multi-layered core comprises only one metal layer that extends over an area greater than 65% of an area of a major surface of the planar multilayered core, said only one metal layer comprising lead for shielding against x-rays.

12. The detector of claim 3, wherein the planar multi-layered core comprises a thickness of between about one-eighth inch and about one-half inch, including electronic circuitry.

13. The detector of claim 3, further comprising a shock absorbing foam layer between an inner surface of the enclosure and the two-dimensional array of photo-sensitive cells.

14. The detector of claim 2, wherein the enclosure comprises a material selected from the group consisting of aluminum, magnesium, and plastic.

15. A digital radiographic detector comprising:
a planar multi-layered assembly comprising a two-dimensional array of photo-sensitive cells, the planar multi-layered assembly including a foam layer having a plurality of recesses formed on a first side thereof, each of the recesses selectively formed to match a shape of only one of a plurality of electronic circuit boards such that each of the plurality of recesses is configured to fit only one of the plurality of electronic circuit boards positioned therein; and
a housing configured to enclose the planar multi-layered assembly.

16. The detector of claim 15, wherein the foam layer includes a recess formed on a second side thereof opposite the first side, the recess formed on the second side having a same shape as a conductive layer positioned therein, the conductive layer electrically connected to at least two of the electronic circuit boards positioned in the recesses formed on the first side of the foam layer.

17. The detector of claim 16, wherein the foam layer includes a battery recess formed on the first side thereof, the housing includes a surface having a battery opening therethrough, and wherein the battery opening is aligned with the battery recess such that a battery may be positioned in the battery recess through the battery opening.

18. A digital radiographic detector comprising:
a housing;
a two-dimensional array of photo-sensitive cells within the housing;
a plurality of electronic circuit boards within the housing, at least some of the electronic circuit boards electrically connected to the two-dimensional array of photosensitive cells; and
a planar foam body for securing in preselected relative positions the plurality of electronic circuit boards inside the housing, the planar foam body having a plurality of recesses formed on a first side thereof, each of the recesses selectively shaped to be equivalent to a shape of only one of the plurality of electronic circuit boards.

19. The detector of claim 18, further comprising:
electrically conductive lines electrically connected to the electronic circuit boards and extending around an edge of the planar foam body to the two-dimensional array of photo-sensitive cells; and
a foam end cap having a thermal channel formed therein that is configured to be thermally coupled to the electrically conductive lines and to cover the electrically conductive lines.

20. The detector of claim 18, wherein the planar foam body includes a recess formed on a second side thereof opposite the first side, the recess formed on the second side having a same shape and size as a conductive layer positioned therein, the conductive layer electrically connected to at least two of the electronic circuit boards positioned in the recesses formed on the first side of the foam layer.

* * * * *